United States Patent
Spath et al.

(10) Patent No.: US 10,140,454 B1
(45) Date of Patent: Nov. 27, 2018

(54) SYSTEMS AND METHODS FOR RESTARTING COMPUTING DEVICES INTO SECURITY-APPLICATION-CONFIGURED SAFE MODES

(71) Applicant: Symantec Corporation, Mountain View, CA (US)

(72) Inventors: Robert Spath, Manlo Park, CA (US); David Kane, Los Angeles, CA (US); Wilson Meng, San Gabriel, CA (US); Sonia Subramanian, Marina Del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 156 days.

(21) Appl. No.: 14/869,046

(22) Filed: Sep. 29, 2015

(51) Int. Cl.
*G06F 21/57* (2013.01)
*H04L 29/06* (2006.01)

(52) U.S. Cl.
CPC .......... *G06F 21/577* (2013.01); *G06F 21/575* (2013.01); *H04L 63/145* (2013.01); *G06F 2221/034* (2013.01)

(58) Field of Classification Search
CPC ................. G06F 21/577; G06F 21/575; G06F 2221/034; H04L 63/145
See application file for complete search history.

(56) References Cited

U.S. PATENT DOCUMENTS

| | | | |
|---|---|---|---|
| 8,955,138 B1 | 2/2015 | Mahadik et al. | |
| 2005/0024340 A1* | 2/2005 | Bathiche | G06F 3/0238 345/170 |
| 2006/0005034 A1* | 1/2006 | Willman | G06F 21/575 713/182 |
| 2006/0075216 A1* | 4/2006 | Vaha-Sipila | G06F 21/575 713/2 |

(Continued)

OTHER PUBLICATIONS

"KMDF Filter Driver: 30-Minutes—Installation: Ah . . . Somewhat Longer", http://www.osronline.com/article.cfm?id=446&nocache=1, as accessed Aug. 31, 2015, The NT Insider, Jan.-Feb. 2006, vol. 13, Issue 1, (Mar. 8, 2006).

*Primary Examiner* — Eleni A Shiferaw
*Assistant Examiner* — Cheng-Feng Huang
(74) *Attorney, Agent, or Firm* — Fisher Broyles, LLP (57) ABSTRACT

The disclosed computer-implemented method for restarting computing devices into security-application-configured safe modes may include (1) configuring a security application to recognize a predetermined signal received via a predetermined hardware device that indicates that a user wants to restart the computing device into a security-application-configured safe mode that prevents suspicious applications from loading, (2) detecting the predetermined signal via an instance of the predetermined hardware device that is connected to the computing device, (3) setting, in response to detecting the predetermined signal, a registry key on the computing device that will instruct the computing device to boot into the security-application-configured safe mode dur- (Continued)

ing a restart sequence, and (4) restarting the computing device in the security-application-configured safe mode in response to detecting the registry key during the restart sequence. Various other methods, systems, and computer-readable media are also disclosed.

15 Claims, 7 Drawing Sheets

(56) References Cited

U.S. PATENT DOCUMENTS

| | | | | |
|---|---|---|---|---|
| 2008/0177994 | A1* | 7/2008 | Mayer | G06F 9/4418 |
| | | | | 713/2 |
| 2011/0016298 | A1* | 1/2011 | McCollom | G06F 21/57 |
| | | | | 713/1 |
| 2013/0174218 | A1* | 7/2013 | Sasaki | H04L 63/102 |
| | | | | 726/1 |
| 2014/0156981 | A1* | 6/2014 | Hamid | G06F 21/575 |
| | | | | 713/2 |
| 2014/0181971 | A1* | 6/2014 | Tatarinov | G06F 21/316 |
| | | | | 726/23 |

* cited by examiner

SYSTEMS AND METHODS FOR RESTARTING COMPUTING DEVICES INTO SECURITY-APPLICATION-CONFIGURED SAFE MODES

BACKGROUND

Viruses, Trojans, spyware, and other kinds of malware are a constant threat to any computing device that requires network connectivity. Many different types of security systems exist to combat these threats, ranging from browser plug-ins to virus scanners to firewalls and beyond. Despite these precautions, computing devices continue to be infected by threats of all types. Even when a computing device is protected by the most up to date definitions and heuristics, an attack may bypass several layers of security systems without being detected. One common type of attack is ransomware, which encrypts valuable files or even entire operating systems and holds the computing device hostage until the ransom is paid.

Unfortunately, traditional systems for remediating malware infections may not be capable of removing ransomware once a computing device has become infected. Because ransomware often locks down an entire computing device, preventing the user from interacting with other applications, a user may be unable to initiate an anti-malware scan on the computing device. Restarting the computing device into a traditional safe mode may require precise timing and may not be enough to prevent the ransomware from executing. Accordingly, the instant disclosure identifies and addresses a need for additional and improved systems and methods for restarting computing devices into security-application-configured safe modes.

SUMMARY

As will be described in greater detail below, the instant disclosure describes various systems and methods for restarting computing devices into security-application-configured safe modes by setting a registry key that triggers the restart into the security-application-configured safe mode in response to receiving a predetermined signal from a user via a predetermined hardware device.

In one example, a computer-implemented method for restarting computing devices into security-application-configured safe modes may include (1) configuring a security application to recognize a predetermined signal received via a predetermined hardware device that indicates that a user wants to restart the computing device into a security-application-configured safe mode that prevents suspicious applications from loading, (2) detecting the predetermined signal via an instance of the predetermined hardware device that is connected to the computing device, (3) setting, in response to detecting the predetermined signal, a registry key on the computing device that will instruct the computing device to boot into the security-application-configured safe mode during a restart sequence, and (4) restarting the computing device in the security-application-configured safe mode in response to detecting the registry key during the restart sequence.

In one embodiment, the predetermined hardware device may include a keyboard and the predetermined signal may include the user performing a predetermined sequence of key presses on the keyboard. In another embodiment, the predetermined hardware device may include removable media and the predetermined signal may include the user connecting the removable media to the computing device.

In one embodiment, the security-application-configured safe mode may prevent the suspicious applications from loading by allowing only known trusted applications to load on the computing device. In some embodiments, the known trusted applications may include applications signed by a known trusted signatory and/or applications with a reputation above a predetermined reputation threshold.

In one embodiment, the computer-implemented method may further include performing, by the security application, a security scan of the computing device after restarting the computing device into the security-application-configured safe mode. In some examples, the computer-implemented method may further include removing the registry key after restarting the computing device into the security-application-configured safe mode. Additionally or alternatively, restarting the computing device may include displaying a notification to the user that the security application is about to restart the computing device.

In one embodiment, detecting the predetermined signal may be performed in response to the user inputting the predetermined signal upon detecting ransomware on the computing device. In this embodiment, restarting the computing device into the security-application-configured safe mode may prevent the ransomware from executing on the computing device while the security application removes the ransomware.

In one embodiment, a system for implementing the above-described method may include (1) a configuration module, stored in memory, that configures a security application to recognize a predetermined signal received via a predetermined hardware device that indicates that a user wants to restart the computing device into a security-application-configured safe mode that prevents suspicious applications from loading, (2) a detection module, stored in memory, that detects the predetermined signal via an instance of the predetermined hardware device that is connected to the computing device, (3) a setting module, stored in memory, that sets, in response to detecting the predetermined signal, a registry key on the computing device that will instruct the computing device to boot into the security-application-configured safe mode during a restart sequence, (4) a restarting module, stored in memory, that restarts the computing device in the security-application-configured safe mode in response to detecting the registry key during the restart sequence, and (5) at least one physical processor configured to execute the configuration module, the detection module, the setting module, and the restarting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) configure a security application to recognize a predetermined signal received via a predetermined hardware device that indicates that a user wants to restart the computing device into a security-application-configured safe mode that prevents suspicious applications from loading, (2) detect the predetermined signal via an instance of the predetermined hardware device that is connected to the computing device, (3) set, in response to detecting the predetermined signal, a registry key on the computing device that will instruct the computing device to boot into the security-application-configured safe mode during a restart sequence, and (4) restart the computing device in the security-application-configured safe mode in response to detecting the registry key during the restart sequence.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for restarting computing devices into security-application-configured safe modes. As will be explained in greater detail below, by restarting the computing device into a specialized safe mode in response to detecting a signal via a hardware device, the systems and methods described herein may enable a user to communicate to a security application that the computing device is infected with ransomware even if the ransomware has locked down the user interface. By only allowing trusted applications to boot in the security-application-configured safe mode, the systems and methods described herein may prevent the ransomware from loading and thus may remove the ransomware without being hindered by the ransomware.

Figure 1:
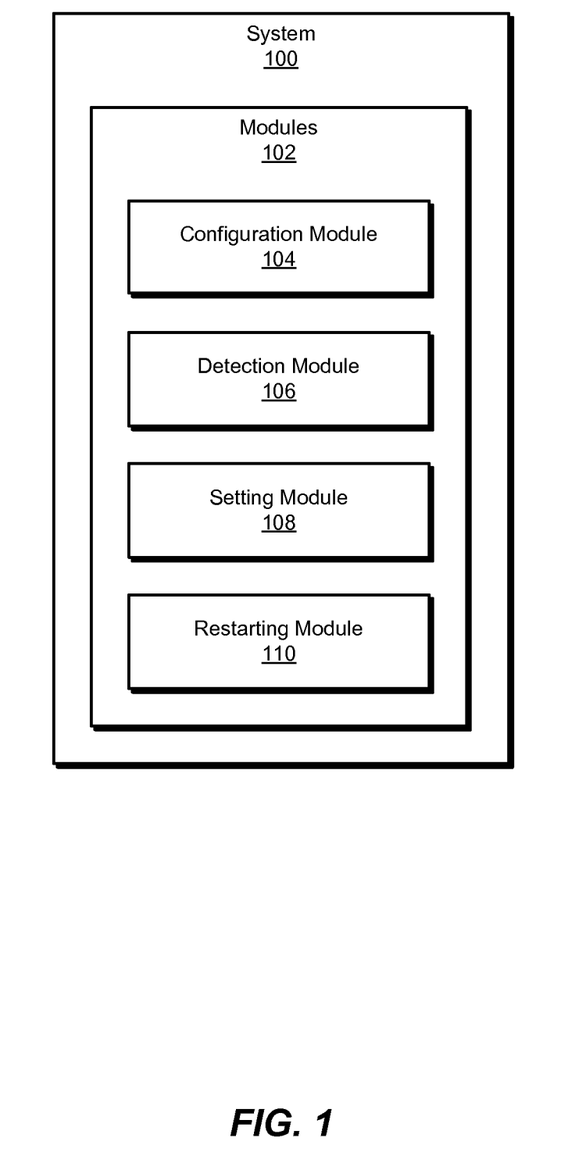
FIG. 1 is a block diagram of an exemplary system for restarting computing devices into security-application-configured safe modes.
Figure 2:
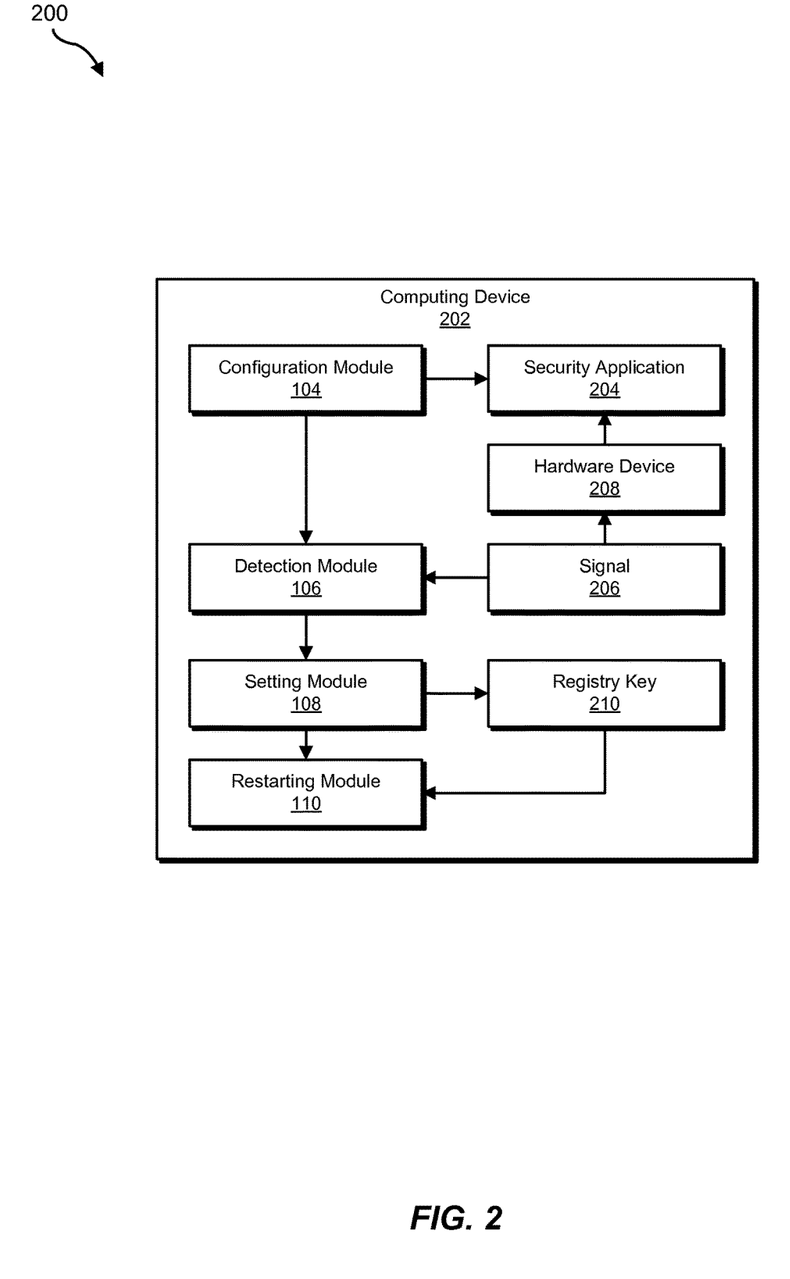
FIG. 2 is a block diagram of an additional exemplary system for restarting computing devices into security-application-configured safe modes.
Figure 3:
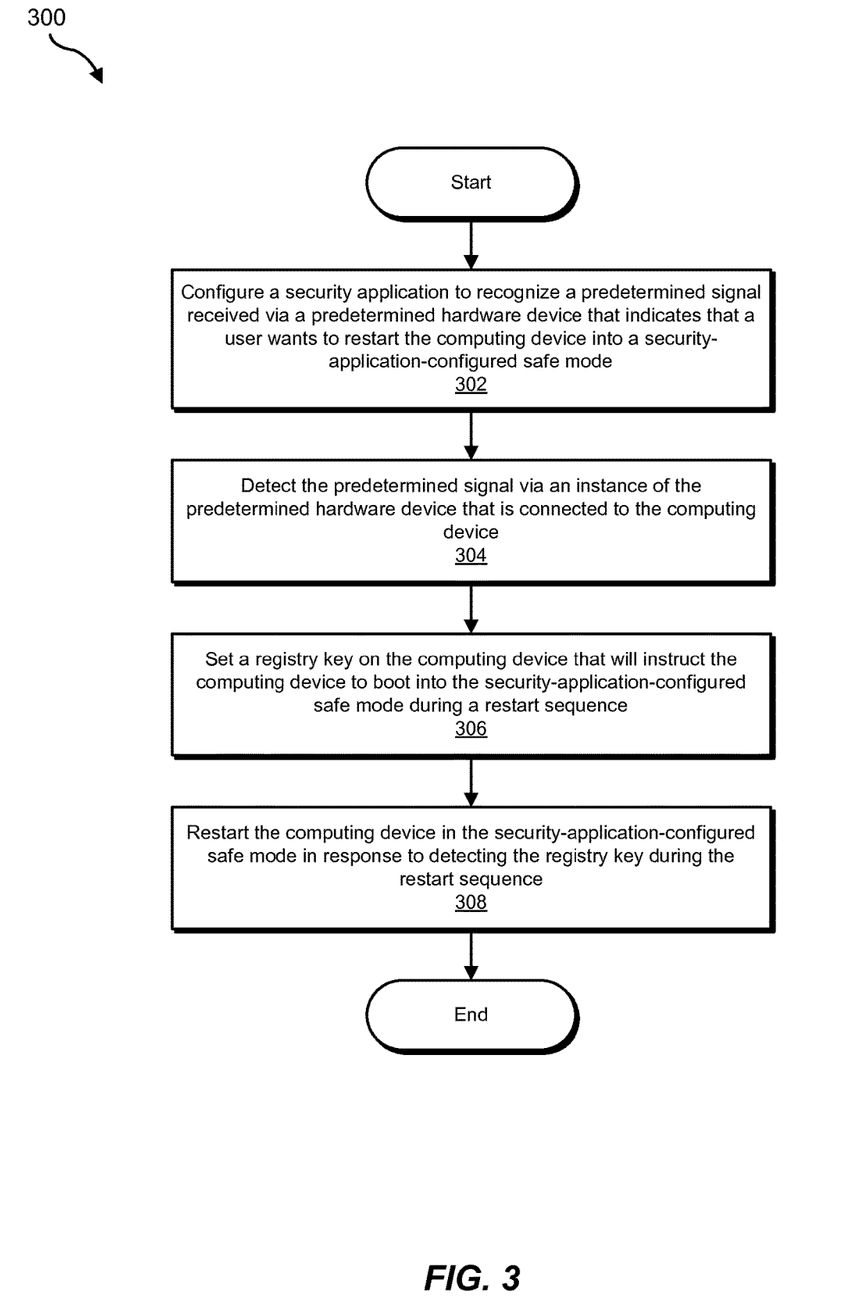
FIG. 3 is a flow diagram of an exemplary method for restarting computing devices into security-application-configured safe modes.
Figure 4:
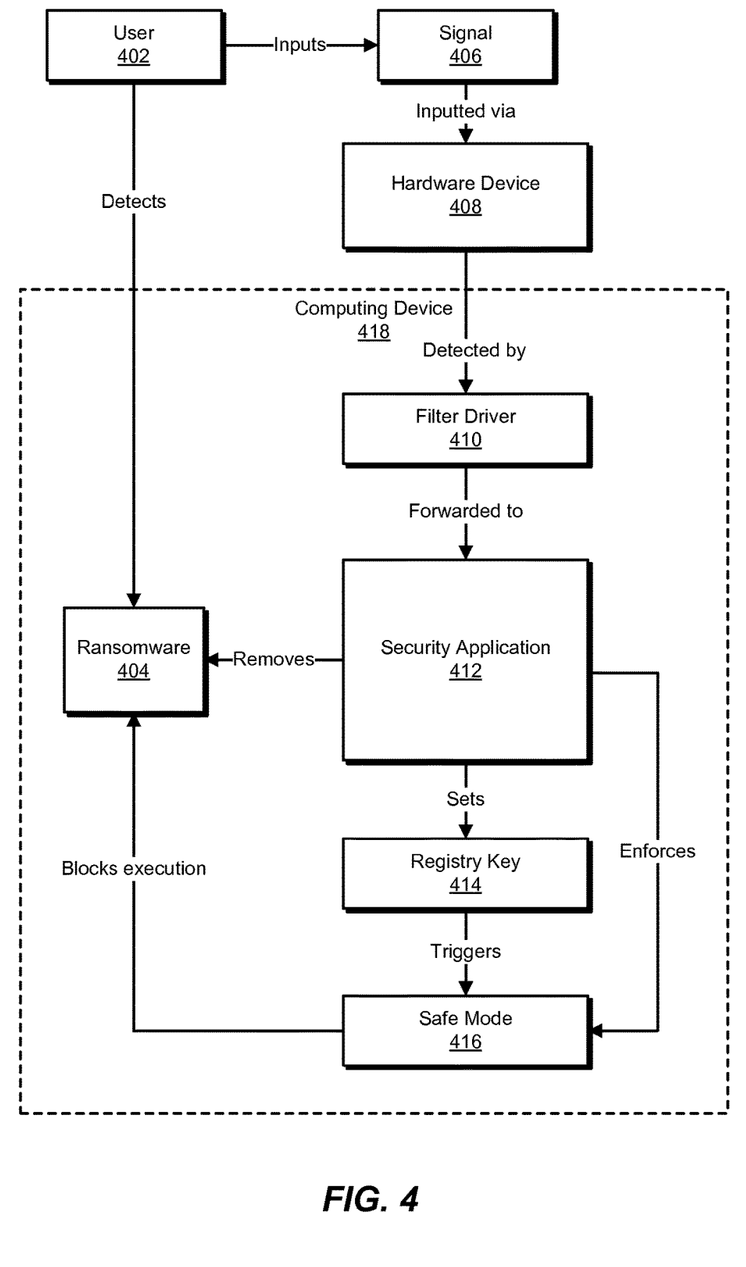
FIG. 4 is a block diagram of an exemplary computing system for restarting computing devices into security-application-configured safe modes.

The following will provide, with reference to FIGS. 1, 2, and 4, detailed descriptions of exemplary systems for restarting computing devices into security-application-configured safe modes. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for restarting computing devices into security-application-configured safe modes. As illustrated in this figure, exemplary system 100 may include one or more modules 102 for performing one or more tasks. For example, and as will be explained in greater detail below, exemplary system 100 may include a configuration module 104 that configures a security application to recognize a predetermined signal received via a predetermined hardware device that indicates that a user wants to restart the computing device into a security-application-configured safe mode that prevents suspicious applications from loading. Exemplary system 100 may additionally include a detection module 106 that detects the predetermined signal via an instance of the predetermined hardware device that is connected to the computing device. Exemplary system 100 may also include a setting module 108 that sets, in response to detecting the predetermined signal, a registry key on the computing device that will instruct the computing device to boot into the security-application-configured safe mode during a restart sequence. Exemplary system 100 may additionally include a restarting module 110 that restarts the computing device in the security-application-configured safe mode in response to detecting the registry key during the restart sequence. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to restart computing devices into security-application-configured safe modes. For example, and as will be described in greater detail below, configuration module 104 may configure a security application 204 to recognize a signal 206 received via a hardware device 208 that indicates that a user wants to restart computing device 202 into a security-application-configured safe mode that prevents suspicious applications from loading. At some later time, detection module 106 may detect signal 206 via an instance of hardware device 208 that is connected to computing device 202. Next, setting module 108 may set, in response to detecting signal 206, a registry key 210 on computing device 202 that will instruct computing device 202 to boot into the security-application-configured safe mode during a restart sequence. Finally, restarting module 110 may restart computing device 202 in the security-application-configured safe mode in response to detecting registry key 210 during the restart sequence.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for restarting computing devices into security-application-configured safe modes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may configure a security application to recognize a predetermined signal received via a predetermined hardware device that indicates that a user wants to restart the computing device into a security-application-configured safe mode that prevents suspicious applications from loading. For example, configuration module 104 may, as part of computing device 202 in FIG. 2, configure security application 204 to recognize a signal 206 received via a hardware device 208 that indicates that a user wants to restart computing device 202 into a security-application-configured safe mode that prevents suspicious applications from loading.

The term "security application," as used herein, generally refers to any application designed to prevent and/or remediate malware infections. In some embodiments, a security application may be capable of initiating and/or configuring specialized safe modes, performing malware scans, and/or removing malware. In some embodiments, a security application may include a group of applications. For example, a security application may include an anti-virus application, an anti-spyware application, and/or a firewall application. Examples of a security application may include, without limitation, SYMANTEC ENDPOINT PROTECTION, NORTON ANTIVIRUS, MICROSOFT SECURITY ESSENTIALS, and/or MALWAREBYTES.

The term "predetermined hardware device," as used herein, generally refers to any hardware device that is part of a computing device and/or can be connected to a computing device. Examples of a predetermined hardware devices may include, without limitation, keyboards, computer mice, trackpads, trackballs, touchscreens, universal services bus (USB) drives, external hard drives, microphones, cameras, compact disks, and/or charging cables. In some embodiments, a predetermined hardware device may be pre-selected by the security application. In other embodiments, a predetermined hardware device may be selected by a user from a list of available hardware devices. In some embodiments, a predetermined hardware device may be a specific instance of a hardware device, such as a USB drive loaded with a certain file, script, and/or application.

The term "predetermined signal," as used herein, generally refers to any input that may be transmitted to a computing device via a hardware device. Examples of predetermined signals may include, without limitation, key presses on a keyboard, mouse clicks and/or gestures on a mouse, trackpad, or touchscreen, inserting and/or removing a compact disk, speaking a phrase or making a noise into a microphone, performing a gesture in front of and/or presenting a visual token to a camera, and/or connecting and/or disconnecting USB devices and/or charging cables.

In one embodiment, the predetermined hardware device may be a keyboard and the predetermined signal may include the user performing a predetermined sequence of key presses on the keyboard. For example, a user may simultaneously press the ALT and SYMANTEC keys on a keyboard in order to input the predetermined signal. In another example, a user may type, "help, ransomware" in order to input the predetermined signal. In some embodiments, the predetermined hardware device may be a specific keyboard that is connected to the computing device at the time that configuration module 104 configures the device and signal. In these embodiments, configuration module 104 may need to re-configure the predetermined hardware device if the original keyboard is replaced with a new keyboard. In some examples, configuration module 104 may be able to automatically re-configure the stored setting that indicates the predetermined hardware device without requiring input from the user. In other embodiments, the predetermined hardware device may include any keyboard that is connected to the computing device. In some embodiments, the sequence of key presses may be stored as key names. In other embodiments, the sequence of key presses may be stored as key codes.

In one embodiment, the predetermined hardware device may include removable media and the predetermined signal may include the user connecting the removable media to the computing device. For example, the predetermined hardware device may be a USB drive with a certain application, signature, script and/or token on it and a user may input the predetermined signal by connecting the USB drive to the computing device. In some examples, any removable storage media with the application, signature, script and/or token may be considered the predetermined hardware device.

The term "security-application-configured safe mode," as used herein, generally refers to any non-default operating mode of a computing system that is configured by a security application rather than by the operating system. In some embodiments, a security-application-configured safe mode may prevent some applications, scripts, services, and/or processes from executing that would normally be free to execute in the default operating mode of the computing device. In some embodiments, the security-application-configured safe mode may prevent the suspicious applications from loading by allowing only known trusted applications to load on the computing device. In one embodiment, the security-application-configured safe mode may only allow a preconfigured whitelist of known trusted applications and/or may block a preconfigured blacklist of known bad applications. In another embodiment, the known trusted applications may be a dynamic category that may include, for example, applications signed by a known trusted signatory and/or applications with a reputation above a predetermined reputation threshold. Additionally or alternatively, the security application may use some other heuristic for determining which applications are trusted and which are suspicious.

The term "suspicious applications," as used herein, generally refers to any application that is not a known trusted application. In some embodiments, a suspicious application may be a malicious application. For example, a suspicious application may be a ransomware application that locks down some or all functionality of a computing device until payment information is sent to the ransomware's operator by the user. In some embodiments, ransomware may lock down every element of a computing device's user interface except for the ransomware itself. Additionally or alternatively, ransomware may prevent some processes from executing and/or terminate processes.

Configuration module 104 may configure the predetermined hardware device and/or the predetermined signal in a variety of ways. For example, configuration module 104 may configure the hardware device and/or signal before the security application is installed. In this example, a user may only have one option of hardware device and/or signal. For example, configuration module 104 may configure the hardware device to be a USB drive loaded with a certain signature and the signal to be connecting the USB drive to the computing device.

In some embodiments, configuration module 104 may configure the hardware device with input from an administrator and/or the signal with input from a user. For example, a user may only be able to select a keyboard as the hardware device but may be able to specify the series of key presses that will constitute the signal. In some embodiments, configuration module 104 may present a list of hardware device and/or signal options to a user. For example, a use may be able to select between speaking a phrase into a microphone, performing a series of mouse gestures, inserting a compact disk, and/or displaying a quick response (QR) code to a camera.

At step 304, one or more of the systems described herein may detect the predetermined signal via an instance of the predetermined hardware device that is connected to the computing device. For example, detection module 106 may, as part of computing device 202 in FIG. 2, detect signal 206 via an instance of hardware device 208 that is connected to computing device 202.

Detection module 106 may detect the signal in a variety of ways. For example, detection module 106 may include a driver and/or filter driver for the hardware device. In one example, detection module 106 may include a keyboard filter driver that may monitor input from the keyboard. In another example, detection module 106 may monitor removable media for devices and/or disks that contain a certain script and/or token. In one embodiment, detection module 106 may passively wait to be contacted by a script launched from an external device. Additionally or alternatively, detection module 106 may monitor input from multiple hardware devices, such as a keyboard, a mouse, and/or a microphone.

At step 306, one or more of the systems described herein may set, in response to detecting the predetermined signal, a registry key on the computing device that will instruct the computing device to boot into the security-application-configured safe mode during a restart sequence. For example, setting module 108 may, as part of computing device 202 in FIG. 2, set, in response to detecting signal 206, registry key 210 on computing device 202 that will instruct computing device 202 to boot into the security-application-configured safe mode during a restart sequence.

The term "registry key," as used herein, generally refers to any organizational unit in an internal database or file on a computing device that is read when the computing device boots. For example, a registry key may be a key-level node in a WINDOWS registry. In another embodiment, a registry key may be an entry in a LINUX configuration file. Additionally or alternatively, a registry key may be an entry in a MAC OS launch services database.

Setting module 108 may set the registry key in a variety of contexts. For example, setting module 108 may be part of the security application and may receive information about the signal from a filter driver and then set the registry key. In another embodiment, setting module 108 may be a separate module from the security application and receive information from the security application that triggers setting module 108 to set the registry key. Additionally or alternatively, setting module 108 may be part of the driver and/or filter driver and may set the registry key upon detecting the signal.

At step 308, one or more of the systems described herein may restart the computing device in the security-application-configured safe mode in response to detecting the registry key during the restart sequence. For example, restarting module 110 may, as part of computing device 202 in FIG. 2, restart computing device 202 in the security-application-configured safe mode in response to detecting registry key 210 during the restart sequence.

Restarting module 110 may restart the computing device in a variety of ways. For example, restarting module 110 may immediately restart the computing device after setting module 108 sets the registry key. In another embodiment, restarting module 110 first display a notification to the user that the security application is about to restart the computing device. In this embodiment, restarting module 110 may also wait to restart the computing device for a predetermined time period in order to give a user an opportunity to cancel the restart. For example, restarting module 110 may display a notification that reads, "Symantec Endpoint Protection has detected the ransomware keyboard code and will restart your computer into Symantec Safe Mode in 30 seconds. Okay/Cancel." In some examples, the notification displayed by restarting module 110 may not be visible because the user interface of the computing device may be controlled by the ransomware. In these examples, restarting module 110 may restart the computing device into the safe mode without receiving input from the user. In some embodiments, the systems described herein may place the driver that initiates the safe mode early enough in the boot load order to apply heuristics to subsequently loading modules such as the ransomware.

In one embodiment, the user may input the predetermined signal upon detecting ransomware on the computing device and restarting module 101 may restart the computing device into the security-application-configured safe mode to prevent the ransomware from executing on the computing device while the security application removes the ransomware. As illustrated in FIG. 4, a user 402 may detect ransomware 404 and may then input a signal 406. Signal 406 may be inputted via hardware device 408, which may be part of computing device 418 (e.g., a built in keyboard or microphone) or may be connected to computing device 418 (e.g., a USB keyboard or compact disk). Filter driver 410 may detect signal 406 as inputted via hardware device 408 and may forward signal 406 to security application 412. In some embodiments, filter driver 410 may be part of security application 412. Security application 412 may set registry key 414 and/or may initiate a restart of computing device 418. Upon restarting, registry key 414 may cause computing device 418 to boot into safe mode 416, which may be configured and/or enforced by security application 412. Safe mode 416 may prevent ransomware 404 from executing, allowing security application 412 to remove ransomware 404.

Figure 5:
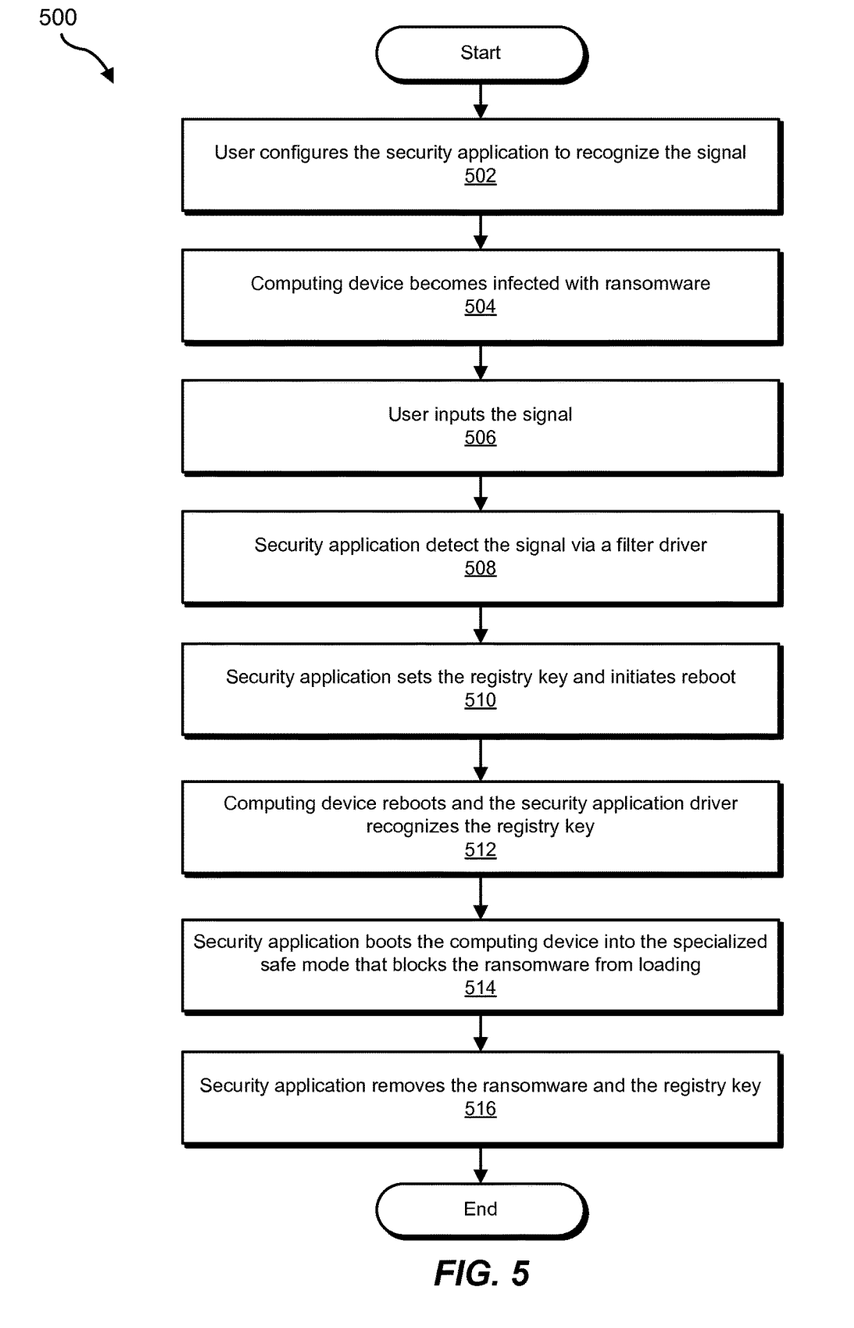
FIG. 5 is a flow diagram of an exemplary method for restarting computing devices into security-application-configured safe modes.

In one embodiment, the security application may perform a security scan of the computing device after restarting the computing device into the security-application-configured safe mode. Additionally or alternatively, the security application may remove the registry key after restarting the computing device into the security-application-configured safe mode, as illustrated in FIG. 5. FIG. 5 is a block diagram of an exemplary computing system 500 for restarting computing devices into security-application-configured safe modes. At step 502, a user may configure a security application to recognize a predetermined signal. For example, a user may input a series of key presses that will constitute the signal.

At step 504, which may occur at a much later time than step 502, the computing device may become infected with ransomware. At step 506, a user may input the predetermined signal. For example, the user may perform the same series of key presses that the user previously selected as the predetermined signal. In another example, a user may connect a USB device to the computing device. At step 508, a security application may detect the signal via a filter driver. For example, a keyboard filter driver may detect the key presses. At step 510, the security application may set the registry key and/or initiate a reboot of the computing device. At step 512, the computing device may reboot and, upon reboot, a driver connected to the security application may recognize the registry key. At step 514, the security application, in response to recognizing the registry key, may boot the computing device into the specialized safe mode that blocks suspicious applications, including the ransomware, from loading and/or executing. At step 516, the security application may remove the ransomware and/or the registry key. In some embodiments, the security application may remove the ransomware by performing a security scan of the computing device and detecting the ransomware in the course of the security scan. In some examples, the security application may perform a quick scan designed to detect ransomware before or instead of performing a complete scan. Additionally or alternatively, the security application may display notifications to the user about the malware scan and/or the safe mode.

In some examples, the security application may remove the registry key immediately after restarting the computing device. In other examples, the security application may remove the registry key after removing the ransomware. In some embodiments, the security application may include safeguards to prevent accidentally initiating an endless loop of safe mode restarts. For example, the security application may be configured to mark the registry key as read as soon as the restart into safe mode is initiated and to ignore registry keys marked as read upon subsequent restarts. In this example, if the computing device crashes before the ransomware remediation is complete, the computing device will not repeatedly boot into the specialized safe mode.

As described in connection with method 300 above, the systems and methods described herein may remediate ransomware infections that would otherwise completely lock down a computing device. The systems described herein may come preconfigured with and/or allow a user to select a signal to be inputted via a hardware device in order to inform a security application that the computing device is infected with ransomware. This signal may be intercepted by a filter driver, a process that, unlike security applications, is unlikely to be terminated by ransomware. The filter driver may then set a registry key that will prompt the computer to restart into a specialized safe mode that is more stringent than the operating system's default safe mode and that the ransomware may not be designed to block the initiation of. The filter driver may then restart the computing device. Upon restarting, a driver for the security application may recognize the registry key and may then boot the device into the specialized safe mode, preventing unsigned or otherwise untrusted applications (i.e., the ransomware) from executing. The security application may also immediately delete the registry key at this time to prevent looping reboots. Because the specialized safe mode may prevent the ransomware from starting, the ransomware may not be able to block the security application from performing a security scan and removing the ransomware. Once the ransomware has been removed, the security application may reboot and/or may prompt the user to reboot the computing device into normal mode. By using a signal recognized by a filter driver to reboot the computing device into a limited safe mode, the systems described herein may be able to safely, effectively, and conveniently remediate ransomware infections.

Figure 6:
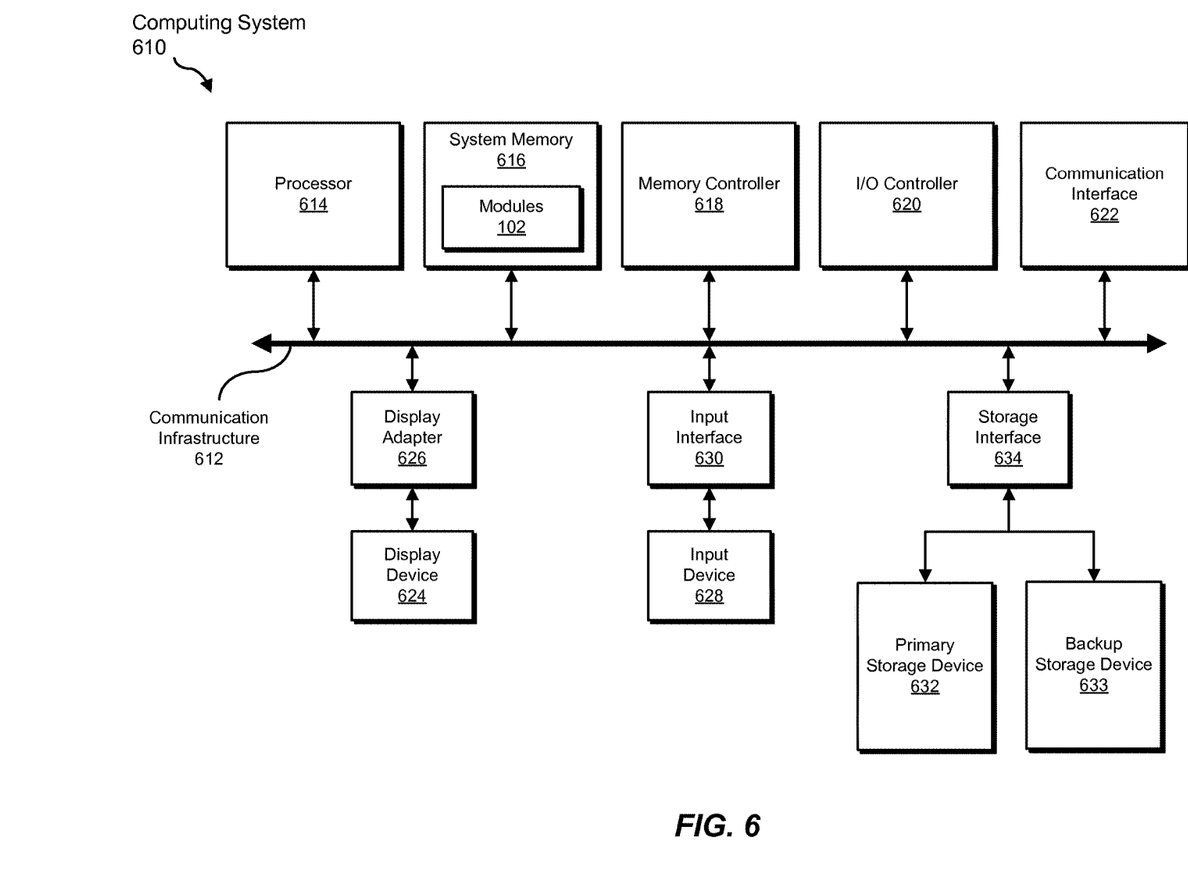
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
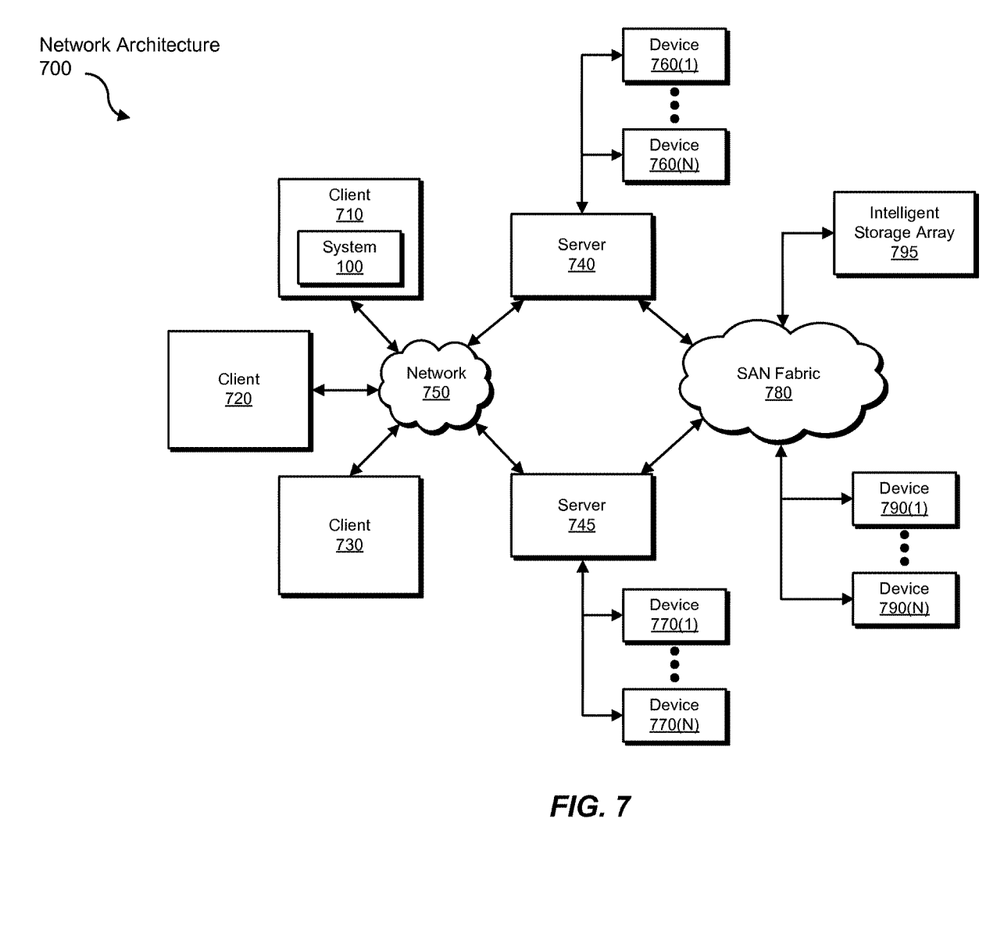
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for restarting computing devices into security-application-configured safe modes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive hardware input to be transformed, transform the hardware input into a predetermined signal, output a result of the transformation to a security application, use the result of the transformation to trigger a restart, and store the result of the transformation to a temporary file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restarting computing devices into security-application-configured safe modes, at least a portion of the method being performed by a computing device comprising at least one processor, the method comprising:
   configuring a security application to recognize a predetermined signal received via a predetermined hardware device that indicates that a user wants to restart the computing device into a security-application-configured safe mode that prevents suspicious applications from loading;
   detecting the predetermined signal via an instance of the predetermined hardware device that is connected to the computing device, wherein detecting the predetermined signal comprises receiving information about the predetermined signal from a driver associated with the predetermined hardware device, wherein the predetermined hardware device comprises removable media and the predetermined signal comprises the user connecting the removable media to the computing device and wherein the predetermined signal is performed in response to the user inputting the predetermined signal upon detecting applications that are not signed by a known trusted signatory as the suspicious applications on the computing device;
   setting, in response to receiving the information about the predetermined signal, a registry key on the computing device that will instruct the computing device to boot into the security-application-configured safe mode during a restart sequence, wherein setting the registry key comprises creating an entry in an internal database of configuration settings on the computing device;
   restarting the computing device in the security-application-configured safe mode in response to detecting the registry key during the restart sequence, wherein restarting the computing device into the security-application-configured safe mode prevents the suspicious applications from executing on the computing device while the security application removes the suspicious applications;
   marking, in response to restarting the computing device in the security-application-configured safe mode, the registry key as read; and
   ignoring the registry key marked as read upon a subsequent restart of the computing device before completion of the removal of the suspicious applications by the security application in the security-application-configured safe mode, thereby preventing the computing device from repeatedly restarting in the security-application-configured safe mode, wherein the suspicious applications comprise ransomware.

2. The computer-implemented method of claim 1, wherein the security-application-configured safe mode prevents the suspicious applications from loading by allowing only known trusted applications to load on the computing device.

3. The computer-implemented method of claim 2, wherein the known trusted applications comprise at least one of:
   applications signed by a known trusted signatory;
   applications with a reputation above a predetermined reputation threshold.

4. The computer-implemented method of claim 1, further comprising performing, by the security application, a security scan of the computing device after restarting the computing device into the security-application-configured safe mode.

5. The computer-implemented method of claim 1, further comprising removing the registry key after restarting the computing device into the security-application-configured safe mode.

6. The computer-implemented method of claim 1, wherein restarting the computing device comprises displaying a notification to the user that the security application is about to restart the computing device.

7. The computer-implemented method of claim 1, wherein the subsequent restart of the computing device is caused by a crash of the computing device.

8. A system for restarting computing devices into security-application-configured safe modes, the system comprising:
   a configuration module, stored in memory, that configures a security application to recognize a predetermined signal received via a predetermined hardware device that indicates that a user wants to restart the computing device into a security-application-configured safe mode that prevents suspicious applications from loading;
   a detection module, stored in memory, that detects the predetermined signal via an instance of the predetermined hardware device that is connected to the computing device, wherein the predetermined signal is detected by receiving information about the predetermined signal from a driver associated with the predetermined hardware device, wherein the predetermined hardware device comprises removable media and the predetermined signal comprises the user connecting the removable media to the computing device and wherein the predetermined signal is performed in response to the user inputting the predetermined signal upon detecting applications that are not signed by a known trusted signatory as the suspicious applications on the computing device;
   a setting module, stored in memory, that sets, in response to receiving the information about the predetermined signal, a registry key on the computing device that will instruct the computing device to boot into the security-application-configured safe mode during a restart sequence, wherein the registry key is set by creating an entry in an internal database of configuration settings on the computing device;
   a restarting module, stored in memory, that:
   restarts the computing device in the security-application-configured safe mode in response to detecting the registry key during the restart sequence, wherein restarting the computing device into the security-application-configured safe mode prevents the suspicious applications from executing on the computing device while the security application removes the suspicious applications;
   marks, in response to restarting the computing device in the security-application-configured safe mode, the registry key as read; and
   ignores the registry key marked as read upon a subsequent restart of the computing device before completion of the removal of the suspicious applications by the security application in the security-application-configured safe mode, thereby preventing the computing device from repeatedly restarting in the security-application-configured safe mode, wherein the suspicious applications comprise ransomware; and at least one physical processor configured to execute the configuration module, the detection module, the setting module, and the restarting module.

9. The system of claim 8, wherein the security-application-configured safe mode prevents the suspicious applications from loading by allowing only known trusted applications to load on the computing device.

10. The system of claim 9, wherein the known trusted applications comprise at least one of:
applications signed by a known trusted signatory;
applications with a reputation above a predetermined reputation threshold.

11. The system of claim 8, wherein the restarting module performs, by the security application, a security scan of the computing device after restarting the computing device into the security-application-configured safe mode.

12. The system of claim 8, wherein the setting module removes the registry key after restarting the computing device into the security-application-configured safe mode.

13. The system of claim 8, wherein the restarting module restarts the computing device by displaying a notification to the user that the security application is about to restart the computing device.

14. A non-transitory computer-readable medium comprising one or more computer-readable instructions that, when executed by at least one processor of a computing device, cause the computing device to:
configure a security application to recognize a predetermined signal received via a predetermined hardware device that indicates that a user wants to restart the computing device into a security-application-configured safe mode that prevents suspicious applications from loading;
detect the predetermined signal via an instance of the predetermined hardware device that is connected to the computing device, wherein detecting the predetermined signal comprises receiving information about the predetermined signal from a driver associated with the predetermined hardware device, wherein the predetermined hardware device comprises removable media and the predetermined signal comprises the user connecting the removable media to the computing device and wherein the predetermined signal is performed in response to the user inputting the predetermined signal upon detecting applications that are not signed by a known trusted signatory as the suspicious applications on the computing device;
set, in response to receiving the information about the predetermined signal, a registry key on the computing device that will instruct the computing device to boot into the security-application-configured safe mode during a restart sequence, wherein the registry key is set by creating an entry in an internal database of configuration settings on the computing device;
restart the computing device in the security-application-configured safe mode in response to detecting the registry key during the restart sequence, wherein restarting the computing device into the security-application-configured safe mode prevents the suspicious applications from executing on the computing device while the security application removes the suspicious applications;
mark, in response to restarting the computing device in the security-application-configured safe mode, the registry key as read; and
ignore the registry key marked as read upon a subsequent restart of the computing device before completion of the removal of the suspicious applications by the security application in the security-application-configured safe mode, thereby preventing the computing device from repeatedly restarting in the security-application-configured safe mode, wherein the suspicious applications comprise ransomware.

15. The non-transitory computer-readable medium of claim 14, wherein the predetermined hardware device comprises a keyboard and the predetermined signal comprises the user performing a predetermined sequence of key presses on the keyboard.

\* \* \* \* \*